(12) United States Patent
Piket et al.

(10) Patent No.: US 7,046,794 B2
(45) Date of Patent: May 16, 2006

(54) DOUBLE TALK ACTIVITY DETECTOR AND METHOD FOR AN ECHO CANCELER CIRCUIT

(75) Inventors: James B. Piket, Gilbert, AZ (US); Keith L. Owens, Crystal Lake, IL (US); Christopher W. Springfield, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 42 days.

(21) Appl. No.: 10/735,300

(22) Filed: Dec. 12, 2003

(65) Prior Publication Data

US 2005/0129225 A1    Jun. 16, 2005

(51) Int. Cl.
*H04M 1/00* (2006.01)

(52) U.S. Cl. .......................... 379/406.04; 379/406.06; 379/406.01; 379/406.05

(58) Field of Classification Search ........... 379/406.01, 379/406.04, 406.05, 406.06

See application file for complete search history.

(56) References Cited

U.S. PATENT DOCUMENTS

| | | | |
|---|---|---|---|
| 5,268,834 A | 12/1993 | Sanner et al. | |
| 5,274,705 A * | 12/1993 | Younce et al. | 379/406.05 |
| 6,195,430 B1 | 2/2001 | Eriksson et al. | |
| 6,532,454 B1 | 3/2003 | Werbos | |
| 6,718,035 B1 * | 4/2004 | Younce et al. | 379/406.01 |
| 6,868,158 B1 * | 3/2005 | Takahashi et al. | 379/406.04 |

\* cited by examiner

*Primary Examiner*—Jefferey F. Harold
(74) *Attorney, Agent, or Firm*—Vedder, Price, Kaufman & Kammholz, P.C.

(57) ABSTRACT

A double talk activity detector (30) and method for an echo canceler circuit (10) improves the probability of detecting a double talk condition based on at least pre-echo canceler uplink data (40). The echo canceler circuit (10) includes a double talk activity probability data generator (30) and an echo canceler stage (20). The double talk activity probability data generator (30) receives pre-echo canceler uplink data (40) and in response produces double talk activity probability data (50). The echo canceler stage (20) is coupled to the double talk activity probability data generator (30) and receives downlink data (60), pre-echo canceler uplink data (40) and the double talk activity probability data (50) and in response produces attenuated uplink data (70).

25 Claims, 8 Drawing Sheets

DOUBLE TALK ACTIVITY DETECTOR AND METHOD FOR AN ECHO CANCELER CIRCUIT

FIELD OF THE INVENTION

The invention relates generally to communication systems and more particularly to echo cancelers and echo cancellation methods.

BACKGROUND OF THE INVENTION

Echo in a communication system is commonly characterized as the return of a part of a transmitted signal from an end user back to the originator of the transmitted signal after a delay period. As is known in the art, a near end user transmits an uplink signal to a far end user. Conversely, the near end user receives a downlink signal from the far end user. For example, echo at the near end occurs when the near end user originates an uplink signal on an uplink path, and a part of the transmitted signal is reflected at the far end as an echo signal on a downlink path back to the near end. Echo at the far end occurs when the far end user originates a downlink signal on the downlink path, and a part of the transmitted signal is reflected at the near end as an echo signal on the uplink path back to the far end. The reflection of the transmitted signal may occur due to a number of reasons, such as an impedance mismatch in a four/two wire hybrid at the far end or feedback due to acoustic coupling in a telephone, wireless device or hands-free speaker phone. An echo signal corresponding to the delayed transmitted signal is perceived as annoying to the near end user and, in some cases, can result in an unstable condition known as "howling."

Echo cancelers are required at any echo generating source at both the near end and at the far end in an attempt to eliminate or reduce the transmission of echo signals. Echo cancelers may be employed in wireless devices, such as personal data assistants (PDAs), cellular phones, two-way radios, car-kits for cellular telephones, car phones and other suitable devices that can move throughout a geographic area. Additionally, echo cancelers may be employed in wireline devices, such as hands-free speaker phones, video and audio conference phones and telephones otherwise commonly referred to in the telecommunications industry as plain old telephone system (POTS) devices. Hands-free speaker phones typically include a microphone to produce the uplink signal, a speaker to acoustically produce the downlink signal, an echo canceler to cancel the echo signal and a telephone circuit.

Echo cancelers attempt to cancel the echo signals produced at the near end when the far end is transmitting by generating echo estimation data corresponding to a portion of an amplified downlink audio signal traveling through the acoustic coupling channel between the speaker and the microphone. The echo canceler models the acoustic coupling channel and in response generates the echo estimation data through the use of an echo canceler adaptive filter. The echo canceler adaptive filter employs modeling techniques using for example a Least Mean Squared (LMS) finite impulse response (FIR) filter having a set of weighting coefficients to model the acoustic coupling channel or other similar modeling techniques known in the art. The echo canceler adaptive filter attempts to subtract the echo estimation data from pre-echo canceler uplink data received by the microphone in order to produce post-echo canceler uplink data. The post-echo canceler uplink data is used by the echo canceler adaptive filter to dynamically update the weighting coefficients of the finite impulse response filter.

The hands-free speaker phone may be integrated into an in-vehicle audio system. The vehicle may be any suitable vehicle, such as an automobile, boat or airplane. The in-vehicle audio system may include an amplifier, speakers and an audio source, such as a tuner circuit, a CD/DVD player, a tape player, a hard drive playback system, a satellite radio, etc. The in-vehicle audio system may be integrated with a communication apparatus, such as a telematics communication module. For example, the telematics communication module may be a component of a General Motors' OnStar system. The telematics communication module typically collects and disseminates data, such as location information and audio, such as speech.

Typically, the downlink audio signal received from the far end through the downlink path is played through at least one speaker in the in-vehicle audio system. However, the hands-free speaker phone installed in the vehicle may experience significant coupling between the at least one speaker and the microphone. As a result, an amplified downlink audio signal transmitted through the at least one speaker will be partially received by the microphone as an echo signal.

Echo cancelers operate in response to detecting four possible modes: downlink talking, uplink talking, double talk and idle. During the downlink talking mode, the echo canceler adaptive filter attempts to model the acoustic coupling channel by dynamically adapting the weighting coefficients of the FIR filter. Additionally, pre-processors and post-processors, such as attenuators, may also be used to reduce the effects of the echo signal.

During the idle mode, the near end user and the far end users are not talking and, therefore, the echo canceler adaptive filter is typically idle, since no downlink signal is present. However, during the double talk mode, the pre-echo canceler uplink microphone signal includes both interfering signals and the echo signal. The interfering signals include near end speech, various noise components, and distortion. The various noise components include nonlinearities of the audio system, speaker distortion, air turbulence over the microphone, road noise, wind rumble, turn signal and windshield wiper noises. As a result, the echo canceler adaptive filter will attempt to remove the echo components based on previous weighting coefficient modeling and attempt to pass the desired transmit signal. If the FIR weighting coefficients are updated during the double talk mode, the weighting coefficients may diverge, resulting in an incorrect estimation of the acoustic coupling channel, which causes the echo canceler adaptive filter to become less effective. The adaptive filter under this condition may effectively remove all the echo components and become unstable. As a result, the corrupted post-echo canceler uplink data may cause audio residual echo or even annoying loud noises at the far end.

According to one method, the echo canceler employs a double talk detector to detect the double talk mode. In response to detecting the double talk mode, the echo canceler will freeze the coefficient updates but still allow the filter to operate in an attempt to remove echo based on previous modeling efforts. However, these double talk detectors produce a binary output, based on a singular metric such as a pre-echo canceler uplink microphone energy level threshold or some form of a correlation threshold. As a result, these double talk detectors are not consistently accurate over the range of conditions encountered in noisy environments, such as an automobile environment. Further, these double talk detectors perform poorly in noisy environments because noise may cause the double talk detector to falsely indicate the presence of near end speech. As a result, residual echo may be heard at the far-end or the uplink data may be improperly attenuated.

BRIEF DESCRIPTION OF THE DRAWINGS

The present invention is illustrated, by way of example and not limitation, in the accompanying figures, in which like reference numerals indicate similar elements and in which.

DETAILED DESCRIPTION OF THE PREFERRED EMBODIMENTS

Figure 1:
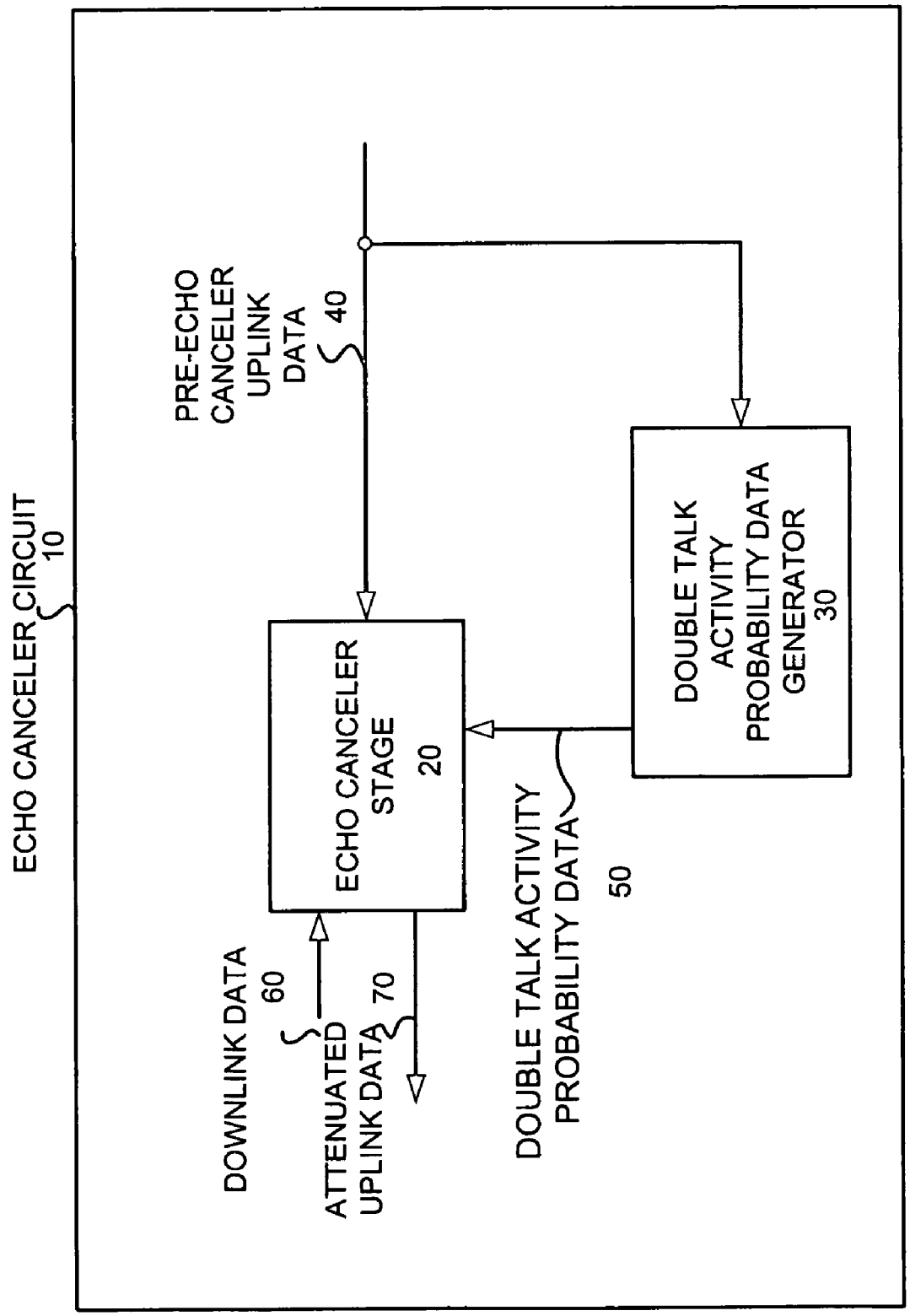
FIG. 1 is a block diagram illustrating one example of an echo canceler circuit according to one embodiment of the invention.

A double talk activity detector and method for an echo canceler circuit improves the probability of detecting a double talk condition based on at least pre-echo canceler uplink data. The echo canceler circuit includes a double talk activity probability data generator and an echo canceler stage. The double talk activity probability data generator receives pre-echo canceler uplink data and in response produces double talk activity probability data. The echo canceler stage is coupled to the double talk activity probability data generator and receives downlink data, pre-echo canceler uplink data and the double talk activity probability data. The echo canceler stage produces attenuated uplink data in response to the pre-echo canceler uplink data and the double talk activity probability data.

Among other advantages, the present invention improves the accuracy of double talk detection even in harsh acoustic environments and further mitigates or eliminates the effects of double talk. Rather than producing a binary indication of a double talk mode based on a singular metric, the double talk activity probability data generator produces double talk activity probability data for establishing a confidence level with respect to the detection of a double talk condition based on multiple metrics. Additionally, the double talk activity probability data produces the double talk activity probability data. The double talk activity probability data generator provides a more accurate indication of a double talk condition than may be provided by a double talk detector that provides a binary indication of a double talk mode based on a singular metric. Additionally, the generation of the double talk activity probability data allows for independent adjustment or control of different components of the echo canceler circuit, such as for example an adaptive filter, a pre-processor and a post-processor which may require different degrees of confidence in the presence of double talk to make the appropriate control decisions. Accordingly, the double talk activity probability data generator may be used to provide one or more mechanisms of control for the various elements of the echo canceler circuit with greater robustness than an echo canceler circuit depending on a singular binary decision. For example, the double talk activity probability data generator may variably control the rate of adaptation of the echo canceler adaptive filter in order to improve the stability of the echo canceler adaptive filter and to adapt to the double talk activity condition. Independently, the double talk activity probability data generator may control the pre or post processing elements of an echo canceller based on separate thresholds related to the degree of confidence in the presence of double talk. The double talk activity probability data generator allows for the control of multiple parameters within the echo canceler circuit based on multiple metrics, such as the detection of noise echo as a result of acoustic coupling between the speaker and microphone and the detection of near end speech.

FIG. 1 is a block diagram of an echo canceler circuit 10 including the echo canceler stage 20 and a double talk activity probability data generator 30. The double talk activity probability data generator 30 receives pre-echo canceler uplink data 40 and in response produces double talk activity probability data 50. The echo canceler stage 20 is coupled to the double talk activity probability data generator 30. The echo canceler stage 20 receives downlink data 60, the pre-echo canceler uplink data 40 and the double talk activity probability data 50, and in response produces at least attenuated uplink data 70.

The echo canceler circuit 10 may compensate for the effects of acoustic coupling between a microphone and a speaker or may compensate for reflections at a far end due to an impedance mismatch, such as a mismatch with a network hybrid circuit as is known in the art. Additionally, the echo canceler circuit 10 may be employed in an analog or digital modem in a telecommunications system as is known in the art. The various links shown in FIG. 1 may be any suitable mechanism for conveying electrical signals or data as appropriate.

The echo canceler circuit 10 may be one or more suitably programmed processors, such as a microprocessor, a microcontroller or a digital signal processor (DSP), and therefore includes associated memory that contains executable instructions that when executed causes the echo canceler's circuit 10 to carry out the operations described herein. In addition, the echo canceler circuit 10 as used herein may include discrete logic, state machines or any other suitable combination of hardware, software, middleware and/or firmware.

Figure 2:
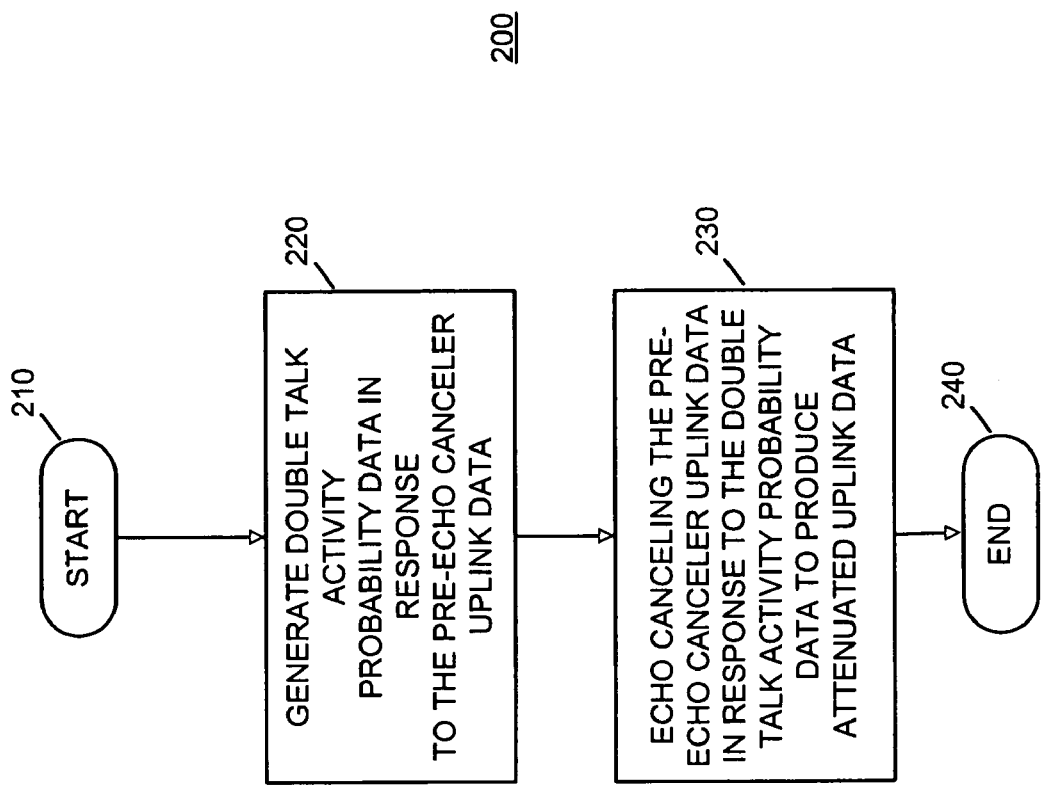
FIG. 2 is a flowchart illustrating one example of a method for controlling an echo canceler in response to double talk activity probability data according to one embodiment of the invention.

FIG. 2 illustrates a method 200 for detecting double talk activity according to one embodiment of the invention. The method 200 may be carried out by the echo canceler circuit 10 with respect to FIG. 1. However, any other suitable structure may also be used. It will be recognized that method 200, beginning with step 210, will be described as a series of operations, but the operations may be performed in any suitable order and may be repeated in any suitable combination.

As shown in step 220, the double talk activity probability data generator 30 receives pre-echo canceler uplink data 40. The double talk activity probability data generator 30 may calculate the power level, energy level or amplitude level for the pre-echo canceler uplink data 40 in order to produce the double talk activity probability data 50. For example, the pre-echo canceler uplink data 40 may include one or more speech frames such that the double talk activity probability data generator 30 may calculate the power level, energy level or amplitude level of the pre-echo canceler uplink data 40 over a suitable period of time. For example, the double talk activity probability data generator 30 may calculate the power level, energy level or amplitude level over one or more speech frames based on an average or any other suitable function. According to one example, a speech frame may span a period of twenty milliseconds corresponding to 160 samples at 8,000 samples per second. The speech frame may correspond to any suitable period of time and any suitable number of samples at any suitable sampling rate.

As shown in step 230, the echo canceler stage 20 receives the pre-echo canceler uplink data 40 and the double talk activity probability data 50 and in response produces the attenuated uplink data 70. The double talk activity probability data generator 30 may analyze the pre-echo canceler uplink data 40 and produce the double talk activity probability data 50 based on a probability density function that relates the detection of near end speech, background noise and far end speech resulting in a probability of double talk activity. According to one embodiment, the probability density function utilized in the double talk activity probability data generator 30 is optimized such that the double talk activity probability data generator 30 is not overly sensitive to false indications of double talk activity due to for example, the presence of background noise or acoustic echo. Additionally, the double talk activity probability data generator 30 is optimized such that the detection of near end speech is sufficiently sensitive and accurate such that appropriate action may be taken by, for example, controlling one or more parameters of the echo canceler stage 20 to prevent the divergence of an echo canceler adaptive filter.

Figure 3:
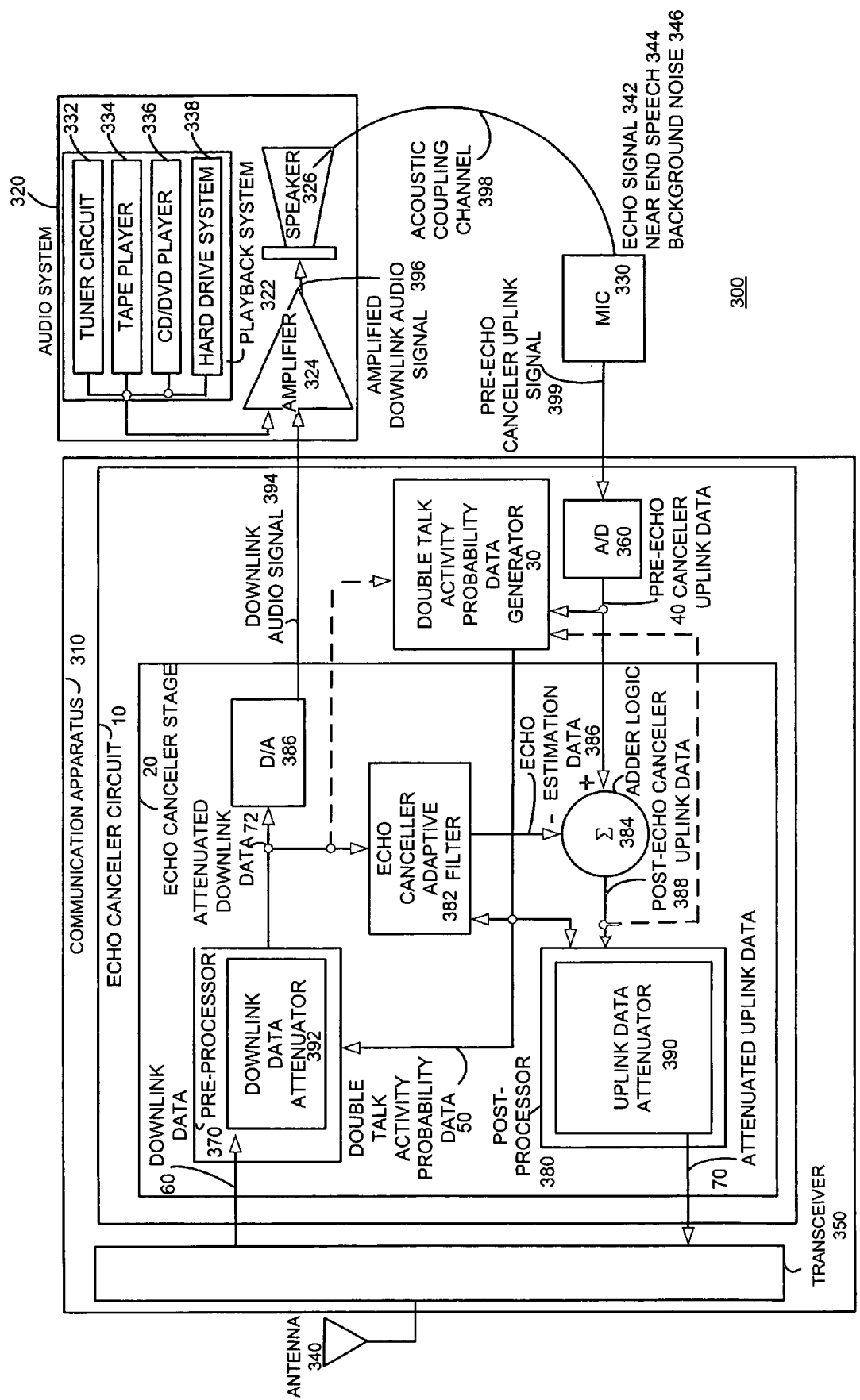
FIG. 3 is a block diagram illustrating one example of a telematics communication module according to another embodiment of the invention.

FIG. 3 is a block diagram of a communication system 300 including a communication apparatus 310, an audio system 320, a microphone 330 and an antenna 340. The microphone 330 receives, for example, an echo signal 342, near end speech 344 and background noise 346. The communication apparatus 310 includes the echo canceler circuit 10 and transceiver 350. The echo canceler circuit 10 includes the echo canceler stage 20, the double talk activity probability data generator 30 and an analog-to-digital converter 360.

The echo canceler stage 20 includes pre-processor 370, post-processor 380, echo canceler adaptive filter 382, adder logic 384 and a digital-to-analog converter 386. According to one embodiment, the echo canceler adaptive filter 382 reduces a rate of echo cancellation adaptation in response to the double talk activity probability data 50. For example, the echo canceler adaptive filter 382 may slow coefficient weighting adaptation when a high probability of double talk occurs or when the confidence that a double talk condition is low in order to reduce the likelihood that the background noise 346 or near end speech 344 causes instability in the echo canceler adaptive filter 382. Slowing coefficient weighting adaptation therefore reduces the likelihood of producing corrupted post-echo canceler uplink data 388. Similarly, the double talk activity probability data 50 can be used to independently control other mechanisms in the echo canceller such as the pre-processor 370 and the post-processor 380. In this manner, greater system control and robustness is achieve through use of the double talk probability data 50 when compared to typical binary double talk metrics known in the art.

The pre-processor 370 receives downlink data 60 and the double talk activity probability data 50 and in response produces attenuated downlink data 72 in response to the downlink data 60. The echo canceler adaptive filter 382 receives attenuated downlink data 72 and post-echo canceler uplink data 388, and in response produces echo estimation data 386. Accordingly, the double talk activity probability data generator 30 accurately detects the presence of background noise 346 and near end speech 344 so that measures may be taken to avoid causing the echo canceler adaptive filter 382 to become unstable. The double talk activity probability data generator 30 distinguishes between the echo signal 342 caused by the acoustic coupling channel 398, near end speech 344, and background noise 346. Accordingly, the double talk activity probability generator 30 avoids misinterpreting the background noise 346 or the near end speech 344 as the echo signal 342 so that the echo canceler adaptive filter 382 does not become unstable. The double talk activity probability data generator 30 accurately detects and distinguishes between the presence of background noise 346, near end speech 346 and the echo signal 342 in order to accurately attenuate the pre-echo canceler uplink data 40 so that corrupted post-echo canceler uplink data 388 is not noticed by the far end user.

According to one embodiment, coefficient weighting adaptation in the echo canceler adaptive filter 382 may be slowed down if there is a high probability of double talk in order to avoid divergence. For example, there may be little harm in slowing coefficient weighting adaptation unnecessarily; however, performing coefficient weighting adaptation in the presence of double talk or excessive background noise 346 may cause instability and the generation of corrupted post-echo canceler uplink data 388. Since the double talk activity probability data generator 30 seeks to avoid the transmission of corrupted attenuated uplink data 70, falsely attenuating the post-echo canceler uplink data 388 is preferred to potentially allowing corrupted attenuated uplink data 70 from being transmitted that will be noticed by the far end user.

The adder logic 384 receives the pre-echo canceler uplink data 40 and echo estimation data 386 and in response produces post-echo canceler uplink data 388. The post-processor 380 is operative to receive the post-echo canceler uplink data 388 and the double talk activity probability data 50 and in response attenuates the post-echo canceler uplink data 388 to produce the attenuated uplink data 70. According to one embodiment, the post-processor 380 includes an uplink data attenuator 390 and the pre-processor 370 includes downlink a data attenuator 392. The uplink data attenuator 390 attenuates the post-echo canceler uplink data 388 to produce the attenuated uplink data 70 in response to the double talk activity probability data 50. Accordingly, if the double talk activity probability data generator 30 determines that a double talk condition exists, and if the probability of a double talk condition exceeds a predetermined level, then the uplink data attenuator 390 may adjust the attenuation of the post-echo canceler uplink data 388 as compared to the situation where downlink data is detected but there is a low probability of double talk. The uplink data attenuator 390 reduces the amplitude of the corrupted post-echo canceler uplink data 388 prior to transmission as attenuated uplink data 70 such that residual echo or possibly corrupted post-echo canceler uplink data 388 is not noticed by the far end user. However, different attenuation strategies may be employed depending on the double talk probability data 50 to ensure no or a reduced level of residual echo is heard at the far end while still allowing desired near end speech to transmit relatively unaffected.

The digital-to-analog converter 386 is coupled to the downlink data attenuator 392. The digital-to-analog converter 386 receives the attenuated downlink data 72 and in response produces a downlink audio signal 394. Audio system 320 includes playback system 322, an amplifier 324 and at least one speaker 326. The playback system 322 includes a tuner circuit 332, a tape player 334, a CD/DVD player 336 and a hard drive 338. The amplifier 324 is coupled to the digital-to-analog converter 386 and receives the downlink audio signal 394 and in response produces an amplified downlink audio signal 396. The microphone 330 is operative to receive at least a portion of the amplified downlink audio signal 396 acoustically produced by the at least one speaker 326 via the acoustic coupling channel 398. In response to the amplified downlink audio signal 396, the microphone 330 produces a pre-echo canceler uplink signal 399. The analog-to-digital converter 360 is coupled to the microphone 330, the adder logic 384 and the double talk activity probability data generator 30. The analog-to-digital converter 360 receives the pre-echo canceler uplink signal 399 and in response produces the pre-echo canceler uplink data 40.

Figure 4:
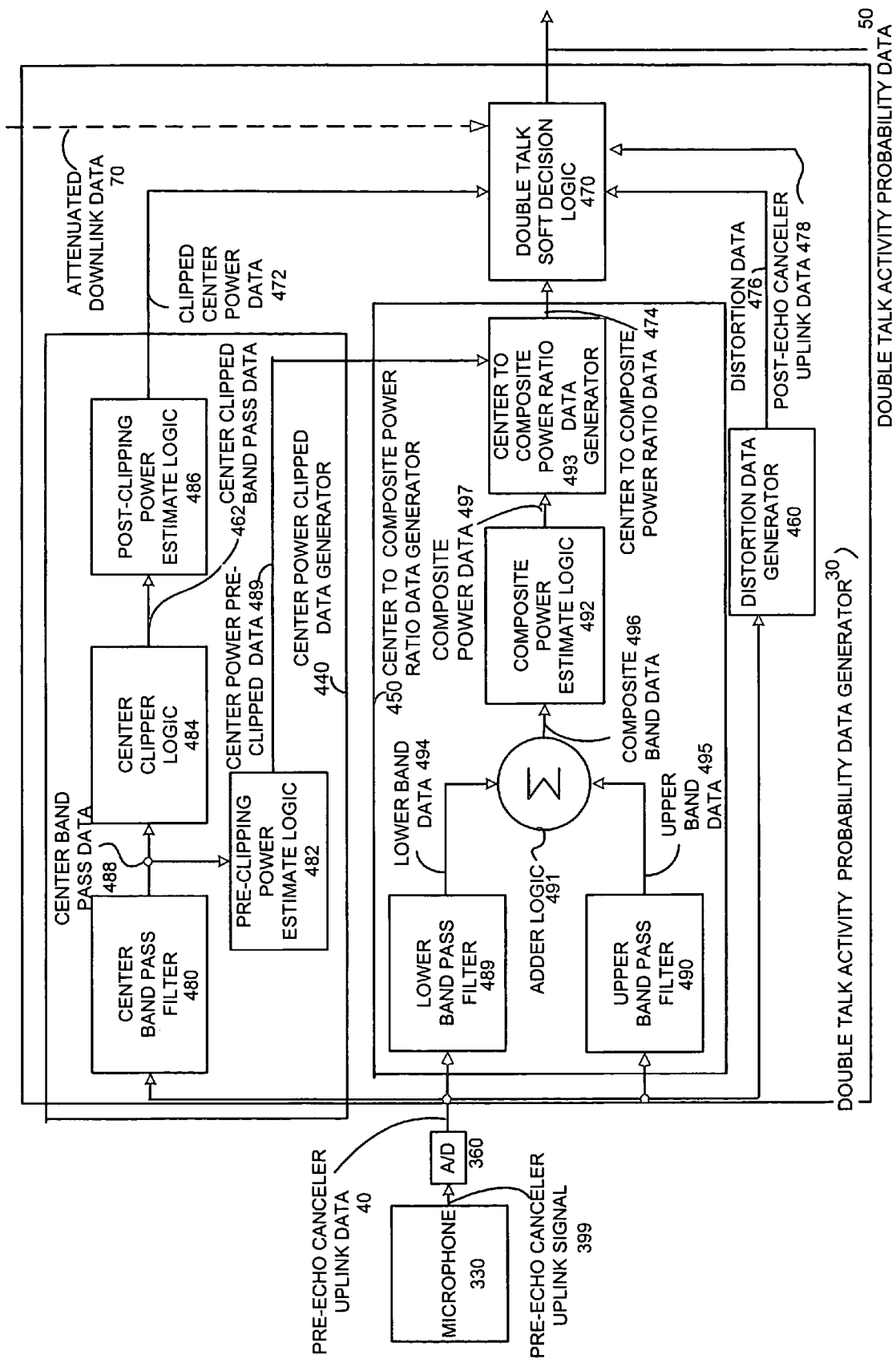
FIG. 4 is a block diagram illustrating an example of a double talk activity detector according to one embodiment of the invention.

FIG. 4 is a block diagram of the double talk activity probability data generator 30 in accordance with one embodiment of the invention. The double talk activity probability data generator 30 includes a center power clipped data generator 440, a center to composite power ratio data generator 450, a distortion data generator 460 and double talk soft decision logic 470. The center power clipped data generator 440 receives the pre-echo canceler uplink data 40 and in response produces center power clipped data 472.

The amplified downlink audio signal 396 that is transmitted through the speaker 326 may have a portion of its frequency spectrum altered in a non-perceptual manner so that the portion of the amplified downlink audio signal 396 that is detected by the microphone 330 and processed by the double talk activity probability data generator 30 as pre-echo canceler uplink data 40 may be identified as near-end speech 344 as opposed to the echo signal 342 or background noise 346. In one such embodiment, a notch filter may remove a portion of the spectrum in the amplified downlink audio signal 396 so that, if the pre-echo canceler uplink data 40 received by the double talk activity probability data generator 30 appears to have the corresponding portion of the spectral band removed, then the double talk activity probability data generator 30 will be able to determine that the received pre-echo canceler uplink data 40 is likely due to the amplified downlink audio signal 396 rather than near end speech 394. As a result, the double talk activity probability data generator 30 may determine that there is a low probability of the occurrence of a double talk condition. Conversely, if the double talk activity probability data generator 30 determines that the pre-echo canceler uplink data 40 includes energy in the spectral band defined by the notch filter, then the double talk activity probability data generator 30 may determine that the pre-echo canceler uplink data 40 is likely receiving near-end speech 344 and therefore a double talk condition exists with a higher degree of probability. Accordingly, the center power clipped data generator 440 may analyze the energy content of the spectral band defined by the notch filter and compare the energy level with a threshold level. If the energy level in the spectrum defined by the spectral band is above an absolute energy level, then the probability of the presence of a double talk condition will be increased.

The center to composite power ratio data generator 450 receives the pre-echo canceler uplink data 40 and in response produces center to composite power ratio data 474. The distortion data generator 460 receives the pre-echo canceler uplink data 40 and in response produces distortion data 476. The double talk soft decision logic 470 is coupled to the center power clipped data generator 440, a center to composite power ratio data generator 450 and the distortion data generator 460. The double talk soft decision logic 470 receives the center power clipped data 472, the center to composite power ratio data 474 and the distortion data 476 and in response produces the double talk activity probability data 50.

The center power clipped data generator 440 includes a center band pass filter 480, pre-clipping power estimate logic 482, center clipper logic 484 and post-clipping power estimate logic 486. The center band pass filter 480 receives the pre-echo canceler uplink data 40 and in response produces the center band pass data 488. The center clipper logic 484 receives the center band pass data 488 and in response produces center clipped band pass data 462. The pre-clipping power estimate logic 482 receives the center band pass data 488 and in response produces center power clipped data 489. The post-clipping power estimate logic 486 receives the center clipped band pass data 462 and in response produces the center power clipped data 472.

The center to composite power ratio data generator 450 includes a lower band pass filter 489, an upper band pass filter 490, adder logic 491, composite power estimate logic 492 and a center to composite power ratio data generator 493. The lower band pass filter 489 receives the pre-echo canceler uplink data 40 and in response produces the lower band data 494. The upper band pass filter 490 receives the pre-echo canceler uplink data 40 and in response produces the upper band data 495. The adder logic 491 receives the lower band data 494 and the upper band data 495 and in response produces composite band data 496. For example, the composite band data 496 represents the upper and lower side band energy level outside of the bandwidth defined by the center band pass filter 480 in order to provide a baseline reference for comparing the energy level within the center of the bandwidth defined by the center band pass filter 480.

The composite to power estimate logic 492 is operative to receive the composite band data 496 and in response produces composite power data 497. The center to composite power ratio data generator 493 receives the composite power data 497 and the center power pre-clipped data 489 and in response produces the center to composite power ratio data 474.

Figure 5:
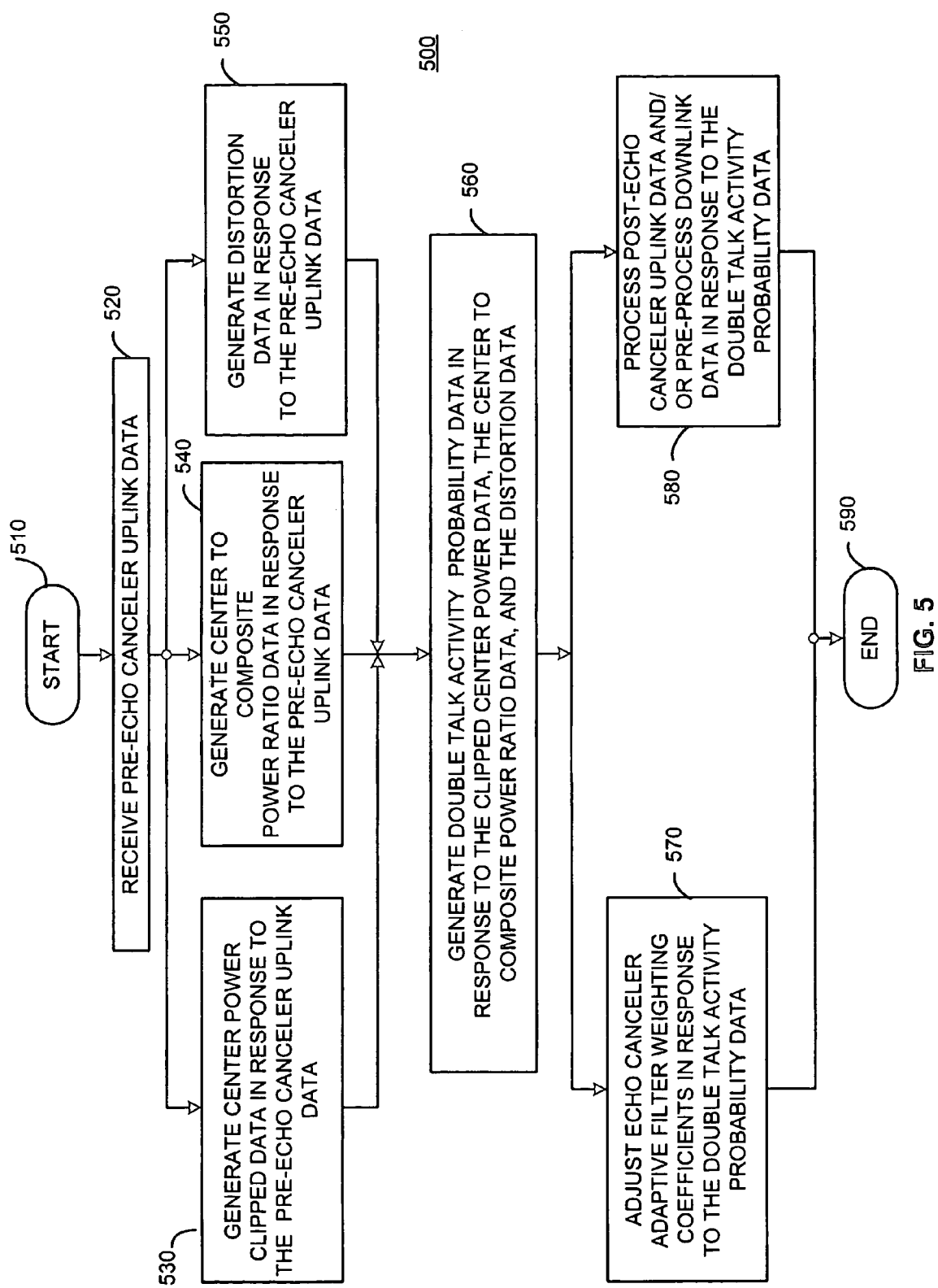
FIG. 5 is a flowchart illustrating one example of a method for controlling the echo canceler circuit in response to double talk activity probability data according to another embodiment of the invention.

FIG. 5 illustrates a method 500 for controlling the echo canceler circuit 10 in response to the double talk activity probability data 50 according to another embodiment of the invention. The method 500 may be carried out by the echo canceler 10. However, any other suitable structure may also be used. It will be recognized that the method 500 beginning with step 510 will be described as a series of operations, but the operations may be performed in any suitable order and may be repeated in any suitable combination. Furthermore, although method 500 ends with step 590, method 500 may loop back to step 510 or to any other suitable step. As shown in step 520, the double talk activity probability data generator 30 receives the pre-echo canceler uplink data 40. As shown in step 530, the center power clipped data generator 440 generates center power clipped data 472 in response to the pre-echo canceler uplink data 40.

As shown in step 540, the center to composite power ratio data generator 450 generates center to composite power ratio data 474 in response to the pre-echo canceler uplink data 40. For example, the center to composite power ratio data generator 450 compares the energy within the spectral band defined by the center band pass filter 480 with the energy on both the upper and lower side bands of the spectral bandwidth defined by the center band pass filter 480. Accordingly, a relative measurement is made between the center bandwidth defined by the bandwidth of the center band pass filter 480 and the upper and the lower side bands of the bandwidth defined by the center band pass filter 480. The relative measurement may provide a measurement of the relative amount of energy between the bandwidth of the center band pass filter 480 and the upper and lower side bands. According to this embodiment, the upper and lower side bands form the composite measurement in order to compare the energy level in the center of the spectrum as defined by the bandwidth of the center band pass filter 480.

As shown in step 550, the distortion data generator 460 generates distortion data 476 in response to the pre-echo canceler uplink data 40. For example, if the received pre-echo canceler uplink data 40 is distorted, the distortion may add noise to the spectrum of the bandwidth defined by the center band pass filter 480, thereby affecting the ability of detecting relevant information in the notch in the spectral bandwidth of the pre-echo canceler uplink data 40. Accordingly, if the distortion data generator 460 determines that the pre-echo canceler uplink data 40 is distorted, then the double talk activity probability data generator 30 may then compensate for the possibility that the spectral energy within the bandwidth defined by the center band pass filter 480 may have been filled or otherwise altered.

As shown in step 560, the double talk soft decision logic 470 generates double talk activity probability data 50 in response to the clipped center power data 472, the center to composite power ratio data 474 and the distortion data 476. Accordingly, the double talk soft decision logic 470 generates double talk activity probability data 50 based on a combination of the absolute power measurement of the in-band signal energy, the relative difference between the in-band and side band energy level measurements, and the detection of distortion.

As shown in step 570, the double talk soft decision logic 470 provides the double talk activity probability data 50 to the echo canceler adaptive filter 382 to adjust the adaptive filter weighting coefficients in response to the double talk activity probability data 50. As previously described, the echo canceler adaptive filter 382 may also reduce the rate of adaptation of the weighting coefficients in order to avoid the divergence of the weighting coefficients and therefore reduce the probability that the echo canceler adaptive filter 382 becomes less effective or possibly unstable.

As shown in step 580, the double talk activity probability data generator 30 provides the double talk activity probability data 50 to the pre-processor 370 to process the downlink data 60. Additionally, the post-processor 380 may process the post-echo canceler uplink data 388 in response to the double talk activity probability data 50. As previously described, the pre-processor 370 and the post-processor 380 may attenuate the downlink data 60 and the post-echo canceler uplink data 388. However, any other type of suitable processing may be employed such as filtering, clipping, spectral or temporal masking, or any other device or technique.

Figure 6:
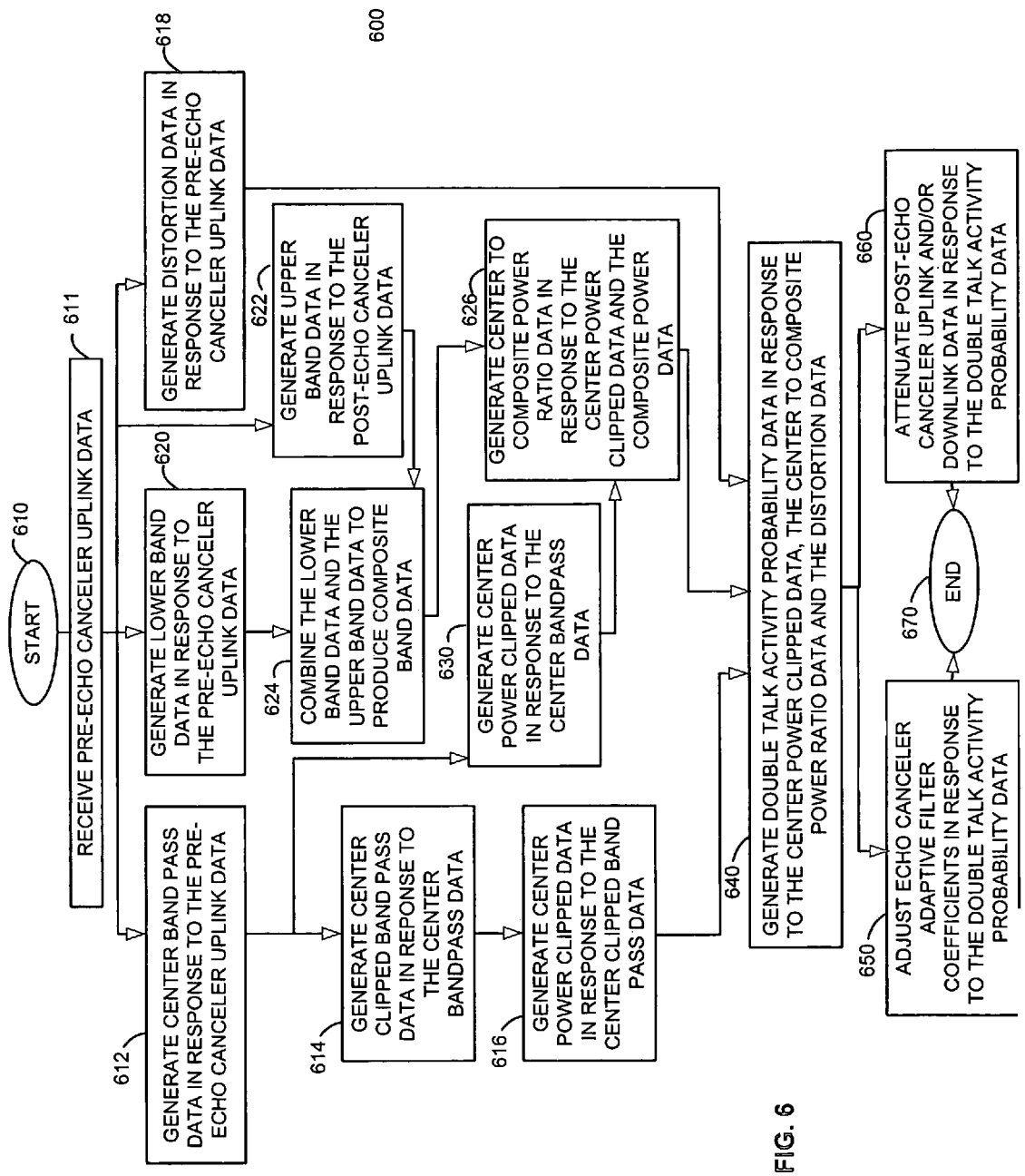
FIG. 6 is a flowchart illustrating one example of a method for controlling the echo canceler circuit in response to double talk activity probability data according to yet another embodiment of the invention.

FIG. 6 is a flowchart illustrating one example of a method 600 for controlling the echo canceler circuit in response to the double talk activity probability data 50 according to yet another embodiment of the invention. The method 600 may be carried out by the echo canceler 10. However, any other suitable structure may also be used. It will be recognized that the method 600 beginning with step 610 will be described as a series of operations, but the operations may be performed in any suitable order and may be repeated in any suitable combination. For example, although the method 600 ends with step 670, the method 600 may be repeated by returning to the start at step 610 or at any suitable step and in any combination.

As shown in step 611, the double talk activity probability data generator 30 receives the pre-echo canceler uplink data 40. This step is similar to step 520 in FIG. 5 and step 220 in FIG. 2 as previously described.

As shown in step 612, the center band pass filter 480 generates center band pass data 488 in response to the pre-echo canceler uplink data 40. As shown in step 614, the center clipper logic 484 generates the center clipped band pass data 462 in response to the center band pass data 488. As shown in step 616, the post-clipping power estimate logic 486 generates center power clipped data 472 in response to the center clipped band pass data 462.

As shown in step 620, the lower band pass filter 489 generates lower band data 494 in response to the pre-echo canceler uplink data 40. As shown in step 622, the upper band pass filter 490 generates upper band data 495 in response to the pre-echo canceler uplink data 40. As shown in step 624, the adder logic 491 combines the lower band data 494 and the upper band data 495 to produce composite band data 496. The composite power estimate logic 492 in step 624 produces the composite power data 497 in response to the composite band data 496. As shown in step 626, the center to composite power ratio data generator 493 generates center to composite power ratio data 474 in response to the center power clipped data 489 and the composite power data 497. As shown in step 618, the distortion data generator 460 generates distortion data 476 in response to the pre-echo canceler uplink data 40.

As shown in step 640, the double talk soft decision logic 470 generates the double talk activity probability data 50 in response to the clipped center power data 472, the center to composite power ratio data 474 and the distortion data 476.

As shown in step 650, the double talk activity probability data generator 30 provides the double talk activity probability data 50 to the echo canceler adaptive filter 382 to adjust the rate of adaptation, the weighting coefficients, or any other suitable echo canceler filter adaptation parameter. According to one embodiment, the double talk activity probability data generator 30 provides the double talk activity probability data 50 to downlink data attenuator 392 to attenuate the downlink data 60 and in response to produce the attenuated downlink data 72. As shown in step 660, the uplink data attenuator 390 receives the post-echo canceler uplink data 388 and the double talk activity probability data 50 and in response produces the attenuated uplink data 70 in.

Figure 7:
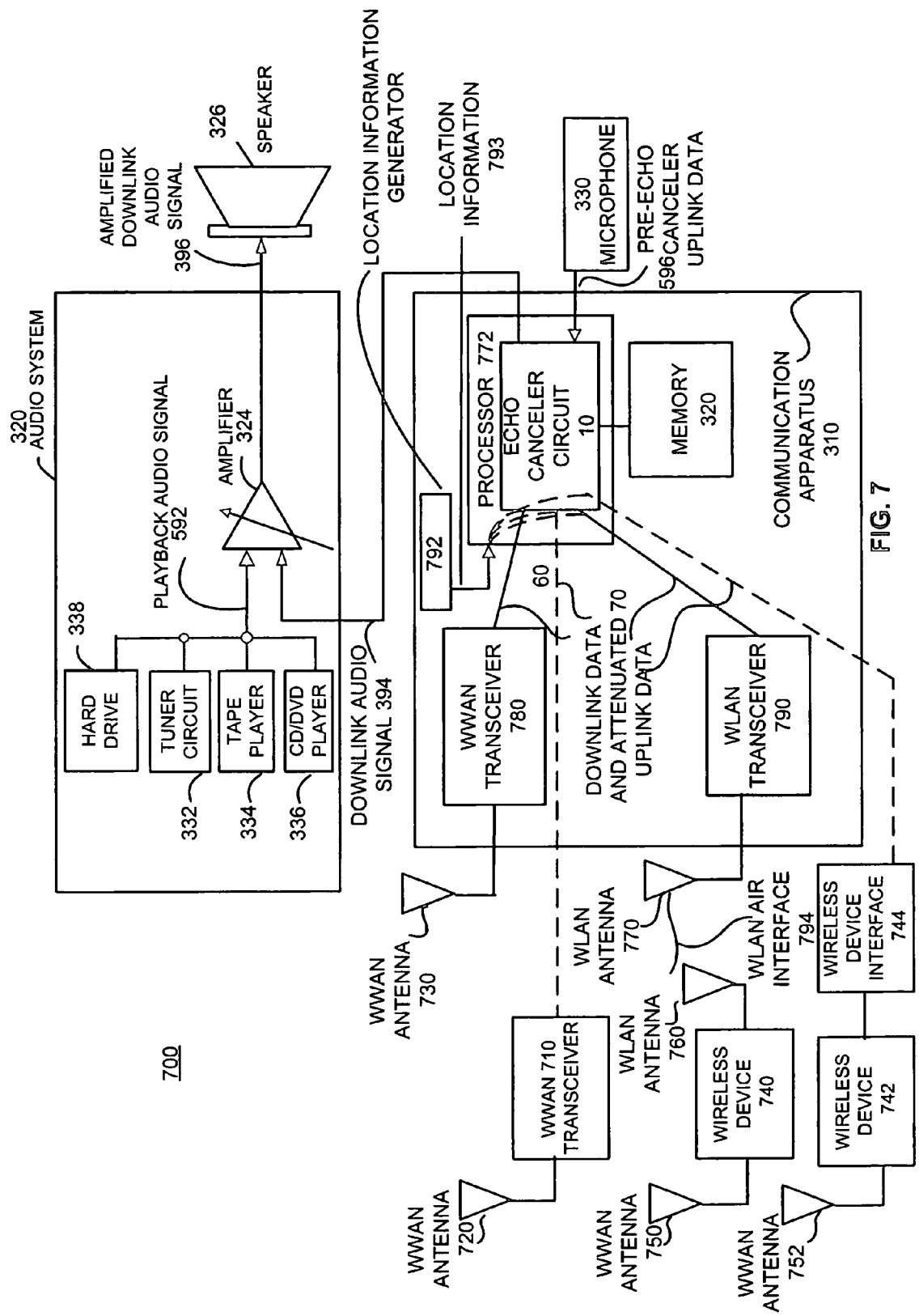
FIG. 7 is a block diagram illustrating an example of a communication system according to one exemplary embodiment of the invention.

FIG. 7 is a block diagram of a communication system 700 according to one exemplary embodiment of the invention. The communication system 700 includes the communication apparatus 310, the audio system 320, the speaker 326, the microphone 330, a wireless wide area network (WWAN) transceiver 710, WWAN antennas 720, 730, 750, 753, a wireless devices 740, 742, wireless interface 744, and wireless local area network (WLAN) antennas 760, 770.

The communication apparatus 310 further includes a processor 772, a WWAN transceiver 780, a WLAN transceiver 790 and a location information generator 792, such as a global positioning system (GPS) receiver. The processor 772 receives location information 793 from the location information generator 792 and in response relays the location information 793 to the WWAN transceiver 710, 780 or to the wireless devices 740, 742.

The processor 772 includes the echo canceler circuit 10. The echo canceler circuit 10 may be coupled to one or more of: the WWAN transceiver 710, the wireless wide area network transceiver 780, the wireless device interface 744 or the WLAN transceiver 790. For example, the WWAN transceivers 780, 710 may represent any one of a number of wireless devices, such as, for example, an in-vehicle mobile phone, a portable cellular phone, a wireless personal digital assistant, a wireless fidelity device (WiFi—i.e., a device based on the IEEE 802.11 specification) or any suitable communication device. According to one embodiment, the WWAN transceiver 710 may be external to the communication apparatus 310, and therefore the echo canceler circuit 10 may be coupled to the wireless wide area network transceiver 710 via an appropriate link, such as a wired cable as is known in the art. According to another embodiment, the WWAN transceiver 790 may be integrated into the communication apparatus 310.

The WLAN transceiver 790 may be a Bluetooth-compliant device or a wireless fidelity device (WiFi—i.e., a device based on the IEEE 802.11 specification) or any suitable communication device. For example, the WWAN transceiver 790 may interface with the wireless device 740 via a local area network interface 794, the WLAN antenna 760, and the wireless local area network antenna 770. The wireless devices 740 may be a cellular phone, a personal digital assistant equipped with a wireless interface, or a portable computer also equipped with a WWAN interface. The wireless devices 740, 742 and WWAN transceivers 710, 780, 790 may communicate with a WWAN, such as a cellular telephone system suitable for communicating with a public switching telephone network (PSTN). Accordingly, the wireless devices 740, 742 may communicate with a cellular telephone system using any wireless communication protocol, such as, for example, code division multiple access (CDMA), time division multiple access (TDMA), advanced mobile phone standard (AMPS) or group special mobile (GSM), or any suitable currently implemented or future protocols, such as the third generation (3G) and higher wireless communication protocols.

The communication apparatus 310 according to one embodiment includes a housing containing the processor 772, the WWAN transceiver 780, the WLAN transceiver WLAN 790 and the location information generator 792. Additional or fewer components may be included in the communication apparatus 310 other than those described above. As is known in the art, the processor 772, the WWAN transceiver 780, the WLAN 790 and the location information generator 792 may each be manufactured as separate circuit boards or integrated circuit chips from one or more manufacturers. The circuit boards may be interconnected as required through the use of a mother board, a flat or non-flat flexible multi-conductor cable, a multi-conductor wired cable or any suitable type of interconnection device. Each circuit board may be attached or coupled either directly or indirectly to the housing or to other circuit boards via a suitable fastening device as is known in the art, such as a connector, a clamp, a clip, a screw, a nut and a bolt. The integrated circuit chips may be interconnected as required via a circuit board, a multi-circuit chip carrier, a flat flexible multiconductor cable, a multiconductor wired cable or any suitable type of interconnection device. The circuit boards and integrated circuit chips may be mounted using chemical bonding such as an adhesive or any suitable fastening device.

According to one embodiment, the communication apparatus 310 housing may include: a circuit board comprising the processor 772 and memory 320, a circuit board comprising the WWAN transceiver 780, and a circuit board comprising the WLAN transceiver 790. The circuit boards may be interconnected and attached or coupled to the housing either directly or indirectly as previously discussed. Additionally, the communication apparatus 310 housing may include connectors for coupling to external components such as the audio system 320, the microphone, 330, WWAN antenna 730, WLAN antenna 770, WWAN transceiver 710 or any other suitable device. For example, the communication apparatus 310 may interface with other suitable components not described herein. The connectors may be any suitable device for interconnecting the communication apparatus 310 to any external components such as via a wired cable, a fiber optic link, or a radio frequency interface.

According to one embodiment, the communication apparatus 310 is a telematics communication module supporting the collection and dissemination of data, including audio speech. For example, the telematics communication module may be based on General Motors' OnStar System, which automatically calls for emergency assistance if the vehicle is in an accident. According to another embodiment, the communication apparatus 310 also can perform such functions as remote engine diagnostics, tracking stolen vehicles and providing roadside assistance, as well as other functions.

Figure 8:
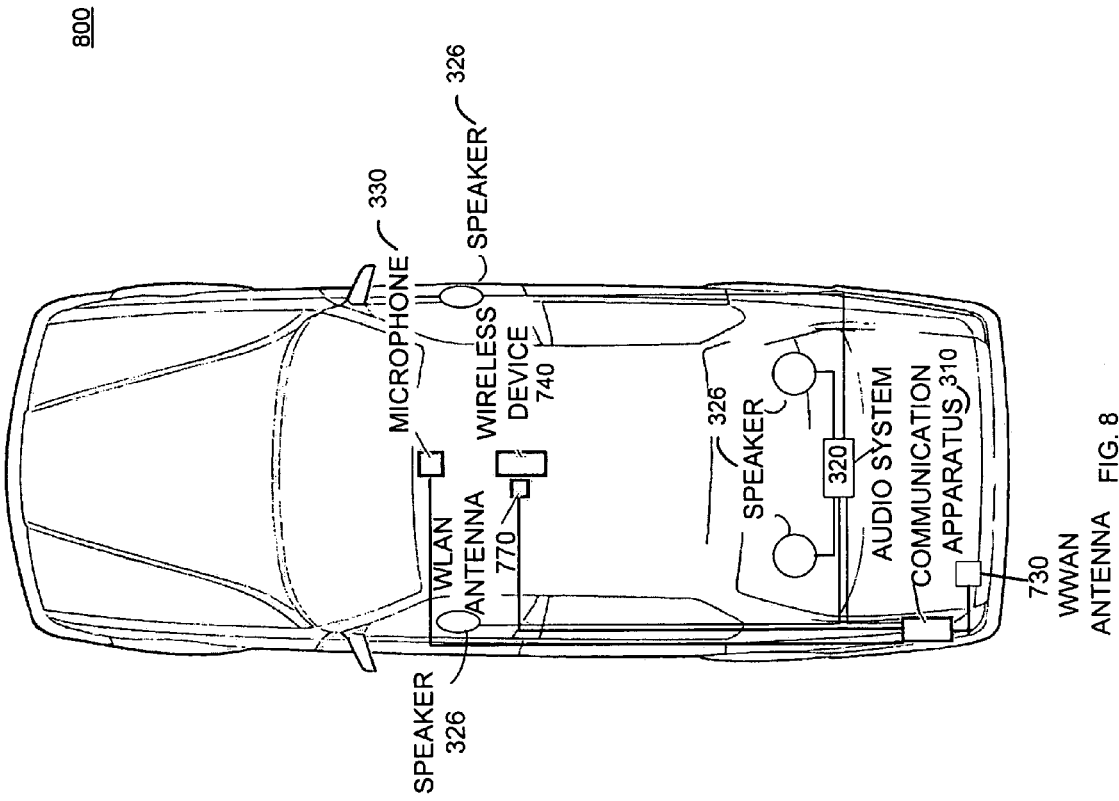
FIG. 8 is a block diagram of an in-vehicle communication system according to one exemplary embodiment of the invention.

FIG. 8 is a block diagram of an in-vehicle communication system 800 according to at least one embodiment of the invention. The in-vehicle communication system 800 includes the communication apparatus 310 coupled to the wireless device 740 via the wireless local area network antenna 770. For example, the WLAN transceiver 790 between the wireless device 740 and the communication apparatus 310 may be a Bluetooth interface or a hard wire connection via a wireless device cradle as previously discussed. For example, the communication apparatus 310 may interface with the wireless device 742 via the wireless device interface 612 such as a wireless device cradle.

According to one embodiment as shown in FIG. 8, the in-vehicle communication system 800 may include the wireless local area network transceiver 790 or, alternatively, it may include the wireless wide area network transceiver 780 that is integrated into the communications apparatus 310 as shown previously with respect to FIG. 7. Alternatively, the communication apparatus 310 may interface with the wireless wide area network transceiver 710 externally to the communication apparatus 310 and may be mounted in any suitable location within the vehicle. The communication apparatus 310 may also interface with the audio system 320 as previously described. Accordingly, although the audio system 320 and the communication apparatus 310 are shown in the trunk area of the vehicle, the communication apparatus 310 and/or the audio system 310 may be located in any suitable location, including on top of, under or in front of the dashboard. According to one embodiment, the vehicle's audio system 320 may include the communication apparatus 310 and any suitable transceiver, such as the wireless wide area network transceiver 780 and the wireless local area network transceiver 790.

Among other advantages, the present invention improves the accuracy of double talk detection even in harsh acoustic environments and also mitigates or eliminates the effects of double talk. Rather than producing a binary indication of a double talk mode based on a singular metric, the double talk activity probability data generator 30 produces double talk activity probability data 50 for establishing a confidence level with respect to the detection of a double talk condition based on multiple metrics. The double talk activity probability data generator 30 provides more robust echo canceller system control, in contrast to the limited control provided by a double talk detector that provides a binary indication of a double talk mode based on a singular metric. The generation of double talk activity probability data 50 allows for independent adjustment or control of different components of the echo canceler circuit 10, such as for example the echo canceler adaptive filter 382, the pre-processor 370 and the post-processor 380. Accordingly, the double talk activity probability data generator 30 may be used to provide one or more mechanisms of control for the various elements of the echo canceler circuit. For example, the double talk activity probability data generator 30 may variably control the rate of adaptation of the echo canceler adaptive filter 382 in order to improve the stability of the echo canceler adaptive filter 382 and to adjust to the double talk activity condition. The double talk activity probability data generator 30 allows for the control of multiple parameters within the echo canceler circuit 10 based on multiple metrics, such as the detection of noise echo as a result of acoustic coupling between the speaker 326 and the microphone 330 and the detection of near end speech 344.

It is understood that the implementation of other variations and modifications of the invention and its various aspects will be apparent to those of ordinary skill in the art and that the invention is not limited by the specific embodiments described. It is therefore contemplated to cover the present modifications, variations or equivalents that fall within the spirit and scope of the basic underlying principles disclosed and claimed herein.

What is claimed is:

1. An echo canceler circuit comprising:
    a double talk activity probability data generator operative to receive pre-echo canceler uplink data and in response to produce double talk activity probability data; and
    an echo canceler stage, operatively coupled to the double talk activity probability data generator and operative to receive downlink data, the pre-echo canceler uplink data and the double talk activity probability data and in response to produce attenuated uplink data.

2. The echo canceler circuit of claim 1 wherein the echo canceler stage includes an echo canceler adaptive filter operatively coupled to the double talk activity probability data generator and operative to receive the double talk activity probability data and the attenuated downlink data and in response to produce echo estimation data and to adjust a rate of echo cancellation adaptation.

3. The echo canceler circuit of claim 1 wherein the echo canceler stage further includes:
    adder logic operative to receive the pre-echo canceler uplink data and echo estimation data and in response to produce post-echo canceler uplink data;
    an uplink data attenuator, operatively coupled to the adder logic, and operative to receive the post-echo canceler uplink data and the double talk activity probability data and in response to attenuate the post-echo canceler uplink data to produce the attenuated uplink data.

4. The echo canceler circuit of claim 1 wherein the double talk activity probability data generator further includes:
    a center power clipped data generator operative to receive the pre-echo canceler uplink data and in response to produce center power pre-clipped data and clipped center power data;
    a center to composite power ratio data generator operative to receive the pre-echo canceler uplink data and the center power pre-clipped data and in response to produce center to composite power ratio data;
    a distortion data generator operative to receive the pre-echo canceler uplink data and in response to produce distortion data; and
    double talk soft decision logic operatively coupled to the center power clipped data generator, the center to composite power ratio data generator and the distortion data generator and operative to receive the clipped center power data, the center to composite power ratio data and the distortion data and in response to produce the double talk activity probability data.

5. The echo canceler circuit of claim 4 wherein the center power clipped data generator further includes:
    a center band pass filter operative to receive the pre-echo canceler uplink data and in response to produce center band pass data;
    center clipper logic operatively coupled to the center band pass filter and operative to receive the center band pass data and in response to produce center clipped band pass data;
    pre-clipping power estimate logic operatively coupled to the center band pass filter and operative to receive the center band pass data and in response to produce the center power pre-clipped data; and
    post-clipping power estimate logic operatively coupled to the center clipper logic and operative to receive the center clipped band pass data and in response to produce the clipped center power data.

6. The echo canceler circuit of claim 5 wherein the center to composite power ratio data generator further includes:
    a lower band pass filter operative to receive the pre-echo canceler uplink data and in response to produce lower band data;
    an upper band pass filter operative to receive the pre-echo canceler uplink data and in response to produce upper band data;
    adder logic operatively coupled to the lower band pass filter and to the upper band pass filter and operative to receive the lower band data and the upper band data and in response to produce composite band data;
    composite power estimate logic operatively coupled to the adder logic and operative to receive the composite band data and in response to produce composite power data; and
    a center to composite power ratio data generator operatively coupled to the composite power estimate logic and to the pre-clipping power estimate logic and operative to receive the composite power data and the center power pre-clipped data and in response to produce the center to composite power ratio data.

7. An echo canceler circuit comprising:
    a double talk activity probability data generator operative to receive pre-echo canceler uplink data and in response to produce double talk activity probability data;
    a pre-processor, operatively coupled to the double talk activity probability data generator, and operative to receive downlink data and the double talk activity probability data and in response to produce attenuated downlink data;

adder logic operatively coupled to receive the pre-echo canceler uplink data and echo estimation data and in response to produce post-echo canceler uplink data;

a post-processor, operatively coupled to the double talk activity probability data generator and to the adder logic, and operative to receive the post-echo canceler uplink data and the double talk activity probability data and in response to attenuate the post-echo canceler uplink data to produce attenuated uplink data.

8. The echo canceler circuit of claim 7 wherein the pre-processor includes a downlink data attenuator operative to receive the downlink data and the double talk activity probability data and in response to attenuate the downlink data to produce the attenuated downlink data, and wherein the post-processor includes an uplink data attenuator operative to receive the post-echo canceler uplink data and the double talk activity probability data and in response to attenuate the post-echo canceler uplink data to produce the attenuated uplink data.

9. The echo canceler circuit of claim 7 further including:

an echo canceler adaptive filter, operatively coupled to the adder logic, the pre-processor and to the double talk activity probability data generator, and operative to receive the attenuated downlink data and the double talk activity probability data and in response to produce the echo estimation data and to change a rate of echo cancellation adaptation.

10. The echo canceler circuit of claim 8 further including:

a digital-to-analog converter, operatively coupled to the downlink data attenuator, and operative to receive the attenuated downlink data and in response to produce a downlink audio signal;

an amplifier, operatively coupled to the digital-to-analog converter, and operative to receive the downlink audio signal and in response to produce an amplified downlink audio signal;

a microphone, operatively coupled to receive at least a portion of the amplified downlink audio signal and in response to produce a pre-echo canceler uplink signal; and an analog-to-digital converter, operatively coupled to the microphone, the adder logic and to the double talk activity probability generator, and operative to receive the pre-echo canceler uplink signal and in response to produce the pre-echo canceler uplink data.

11. A communication apparatus comprising:

a housing having coupled therewith:

an echo canceler circuit within the housing comprising:

a double talk activity probability data generator operative to receive pre-echo canceler uplink data and in response to produce double talk activity probability data;

an echo canceler stage, operatively coupled to the double talk activity probability data generator, and operative to receive downlink audio data, the pre-echo canceler uplink data and the double talk activity probability data and in response to produce the attenuated uplink data; and a transceiver within the housing, operatively coupled to the echo canceler stage, and operative to receive the attenuated uplink data and in response to transmit the attenuated uplink data.

12. The communication apparatus of claim 11 wherein the transceiver is at least one of: a wireless wide area network (WWAN) transceiver and a wireless local area network (WLAN) transceiver.

13. The communication apparatus of claim 12 further including a location information generator operative to produce location information, wherein the echo canceler circuit includes:

one or more processing devices operatively coupled to the location information generator; and memory operatively coupled to the one or more processing devices, containing instructions executable by the one or more processing devices to cause the one or more processing devices to receive the location information from the location information generator and in response to provide the location information to the transceiver, wherein the transceiver transmits the location information.

14. The communication apparatus of claim 11 wherein the transceiver receives downlink audio data and in response provides the downlink audio data to the echo canceler circuit.

15. An in-vehicle communication system comprising:

an echo canceler circuit comprising:

a double talk activity probability data generator operative to receive pre-echo canceler uplink data and in response to produce double talk activity probability data;

an echo canceler stage, operatively coupled to the double talk activity probability data generator, and operative to receive downlink data, the pre-echo canceler uplink data, and the double talk activity probability data and in response to produce attenuated uplink data;

a wireless transceiver operatively coupled to the echo canceler stage and operative to receive the attenuated uplink data and in response to transmit the attenuated uplink data;

an audio system including:

an amplifier, operatively coupled to the echo canceler circuit, and operative to receive attenuated downlink data and in response to produce an amplified downlink audio signal; and a playback system including at least one of: a tuner circuit, a tape player, a CD player, a DVD player and a hard drive, operatively coupled to the amplifier and operative to provide at least a playback audio signal to the amplifier.

16. The in-vehicle communication system of claim 15 wherein the transceiver is at least one of: a wireless wide area network (WWAN) transceiver, a wireless local area network (WLAN) transceiver, and a wireless device.

17. The in-vehicle communication system of claim 15 wherein the echo canceler stage includes an echo canceler adaptive filter operatively coupled to the double talk activity probability data generator and operative to receive the double talk activity probability data and the attenuated downlink data and in response to produce echo estimation data and to reduce a rate of echo cancellation adaptation.

18. The in-vehicle communication system of claim 15 further including a microphone operative to receive at least a portion of the amplified downlink audio signal and in response to produce the pre-echo canceler uplink signal.

19. The in-vehicle communication system of claim 15 further including at least one speaker, operatively coupled to the amplifier, and operative to receive the amplified downlink audio signal and in response to acoustically produce the amplified downlink audio signal.

20. A method for detecting double talk activity comprising:
   generating double talk activity probability data in response to pre-echo canceler uplink data; and
   echo canceling the pre-echo canceler uplink data in response to the double talk activity probability data to produce attenuated uplink data.

21. The method of claim 20 including:
   attenuating downlink data in response to the double talk activity probability data to produce attenuated downlink data.

22. The method of claim 20 including reducing a rate of echo cancellation adaptation in response to the double talk activity probability data.

23. Memory containing instructions executable by one or more processing devices that causes the one or more processing devices to:
   generate double talk activity probability data in response to pre-echo canceler uplink data; and
   echo cancel the pre-echo canceler uplink data in response to the double talk activity probability data to produce attenuated downlink data.

24. The memory of claim 23 containing executable instructions that cause the one or more processing devices to:
   attenuate downlink data in response to the double talk activity probability data to produce attenuated downlink data.

25. The memory of claim 23 containing executable instructions that cause the one or more processing devices to:
   reduce a rate of echo cancellation adaptation in response to the double talk activity probability data.

* * * * *